United States Patent

Sawahashi et al.

(10) Patent No.: US 8,477,706 B2
(45) Date of Patent: Jul. 2, 2013

(54) TRANSMISSION APPARATUS, TRANSMISSION METHOD, RECEPTION APPARATUS AND RECEPTION METHOD

(75) Inventors: Mamoru Sawahashi, Yokohama (JP);
Kenichi Higuchi, Yokohama (JP);
Hiroyuki Atarashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 138 days.

(21) Appl. No.: 13/102,743

(22) Filed: May 6, 2011

(65) Prior Publication Data

US 2011/0211544 A1 Sep. 1, 2011

Related U.S. Application Data

(63) Continuation of application No. 11/909,985, filed as application No. PCT/JP2006/306116 on Mar. 27, 2006, now abandoned.

(30) Foreign Application Priority Data

Apr. 1, 2005 (JP) ................................ 2005-106910

(51) Int. Cl.
*H04B 1/26* (2006.01)
*H04B 7/00* (2006.01)
(52) U.S. Cl.
USPC .......................................... 370/329; 370/500
(58) Field of Classification Search
None
See application file for complete search history.

(56) References Cited

U.S. PATENT DOCUMENTS

| 2002/0196842 | A1 | 12/2002 | Onggosanusi et al. |
| 2003/0063654 | A1 | 4/2003 | Onggosanusi et al. |
| 2003/0125040 | A1 | 7/2003 | Walton et al. |
| 2003/0231606 | A1 | 12/2003 | Wu et al. |
| 2004/0085919 | A1 | 5/2004 | Song et al. |
| 2004/0190484 | A1 | 9/2004 | Shin et al. |
| 2005/0041574 | A1 | 2/2005 | Wu et al. |
| 2005/0073976 | A1 | 4/2005 | Fujii |
| 2005/0084000 | A1 | 4/2005 | Krauss et al. |
| 2005/0152266 | A1 | 7/2005 | Hwang et al. |
| 2005/0190819 | A1* | 9/2005 | Kwon et al. .................. 375/148 |
| 2006/0187876 | A1* | 8/2006 | Schmidl et al. ............... 370/328 |
| 2006/0262714 | A1 | 11/2006 | Tarokh et al. |

FOREIGN PATENT DOCUMENTS

| CN | 1249099 A | 3/2000 |
| EP | 1 594 240 A1 | 11/2005 |
| JP | 2003-032226 A | 1/2003 |

(Continued)

OTHER PUBLICATIONS

Japanese Office Action for Application No. 2009-191402 mailed on Feb. 14, 2012 (3 pages).

(Continued)

*Primary Examiner* — Eunsook Choi
(74) *Attorney, Agent, or Firm* — Osha Liang LLP

(57) ABSTRACT

A transmission apparatus which attempts improvement of signal quality in an uplink and a downlink carries out radio transmission of different signals simultaneously from respective ones of a plurality of antennas. The apparatus has pilot multiplexing means for multiplexing a pilot channel to transmit from each antenna in one or more of a time division multiplexing method, a frequency division multiplexing method and a code division multiplexing method, data multiplexing means for time-multiplexing a pilot channel and a data channel, and means for transmitting a signal in a least one of a space division multiplexing (SDM) method and a space time transmission diversity (STTD) method.

7 Claims, 14 Drawing Sheets

FOREIGN PATENT DOCUMENTS

| | | |
|---|---|---|
| JP | 2003-338802 | 11/2003 |
| JP | 2004-112471 A | 4/2004 |
| JP | 2004-165784 A | 6/2004 |
| JP | 2004-214746 A | 7/2004 |
| JP | 2004-253925 A | 9/2004 |
| JP | 2004-289191 A | 10/2004 |
| JP | 2004-357339 A | 12/2004 |
| JP | 2005-057779 A | 3/2005 |
| KR | 20040083787 | 10/2004 |
| TW | 318983 | 11/1997 |
| TW | 200425671 | 11/2004 |
| WO | 9819410 A2 | 5/1998 |
| WO | 03/096739 A1 | 11/2003 |
| WO | 2004/038984 A2 | 3/2004 |
| WO | 2004/075436 | 9/2004 |
| WO | 2004/082182 A1 | 9/2004 |

OTHER PUBLICATIONS

Patent Abstracts of Japan for Japanese Publication No. 2004-289191, publication date Oct. 14, 2004 (1 page).
International Search Report issued in PCT/JP2006/306116 dated Jun. 27, 2006, 5 pages.
A. van Zelst, "Space Division Multiplexing Algorithm", Proc. 10th Med. Electrotechnical Coference, pp. 1218-1221, 2000 (4 pages).
Taiwanese Office Action for Taiwanese Application No. 095110969, mailed on May 30, 2008 (11 pages).
esp@cenet patent abstract for Korean Publication No. 20040083787, Publication date Oct. 6, 2004 (1 page).
Chinese Office Action for Application No. 200680016810.X, mailed on Mar. 10, 2010 (12 pages).
esp@cenet Patent Abstract for Chinese Publication No. 1249099, publication date Mar. 29, 2001. (1 page).
Japanese Office Action for Application No. 2005-106910, mailed on Jun. 29, 2010, (5 pages).
Patent Abstracts of Japan for Japanese Publication No. 2003-338802, dated Nov. 28, 2003, (1 page).
Japanese Office Action for Application No. 2005-106910, mailed on Feb. 1, 2011 (3 pages).
Patent Abstracts of Japan for Japanese Publication No. 2005-057779, publication date Mar. 3, 2005 (1 page).
Appeal Decision for Japanese Patent Application No. 2005-106910 mailed Jul. 3, 2012, with English translation thereof (21 pages).
3GPP TS 25.211 V.3.8.0, "3rd Generation Partnership Project; Technical Specification Group Radio Access Network; Physical channels and mapping of transport channels onto physical channels (FDD) (Release 1999)"; Sep. 2001 (45 pages).
Patent Abstract for Japanese Publication No. 2004-214746 published Jul. 29, 2004 (1 page).

* cited by examiner

TRANSMISSION APPARATUS, TRANSMISSION METHOD, RECEPTION APPARATUS AND RECEPTION METHOD

CROSS-REFERENCE TO RELATED APPLICATIONS

The present application is a continuation of, and therefore claims benefit under 35 U.S.C. §120 to, U.S. patent application Ser. No. 11/909,985, filed on Sep. 27, 2007, which is a PCT National Phase Application of PCT JP2006306116, filed on Mar. 27, 2006, which claims benefit to Japanese Priority Application No. 2005-106910, filed on, Apr. 1, 2005. These priority applications are hereby incorporated by reference in their entirety herein.

TECHNICAL FIELD

The present invention relates to radio communication, and, in particular, to a transmission apparatus, a transmission method, a reception apparatus and a reception method for a downlink channel.

BACKGROUND ART

In a third generation communication method, represented by IMT-2000 (International Mobile Telecommunications-2000), increasing in a speed and increasing in a capability of a downlink are especially demanded, and, for example, an information transmission rate of equal to or more than 2 Mbps with the use of a frequency band of 5 MHz has been realized. However, further increase in a transmission rate, increase in a capability and cost reduction are demanded for a feature communication system. Further, reduction in a consumption power in a mobile station is required. For example, Non-patent Document 1 discloses a technology for improving transmission quality by adopting a multiple input multiple output (MIMO) method.

Non-patent Document 1: A. Va Zelst, "Space division multiplexing algorithm", Proc. 10th Med. Electrotechnical Conference 2000, pp. 1218-1221

DISCLOSURE OF THE INVENTION

Problem to be Solved by the Invention

A problem to be solved by the present invention is to provide a transmission and reception apparatus and a transmission and reception method for improving signal quality in an uplink and a downlink.

Means for Solving the Problem

According to the present invention, a transmission apparatus which carries out radio transmission of different signals simultaneously from respective ones of a plurality of antennas is used. The apparatus has pilot multiplexing means for multiplexing a pilot channel to transmit from each antenna in one or more of a time division multiplexing method, a frequency division multiplexing method and a code division multiplexing method, data multiplexing means for time-multiplexing the pilot channel and a data channel, and means for transmitting a signal in at least one of a space division multiplexing (SDM) method and a space time transmission diversity (STTD) method.

Advantageous Effect of the Invention

By the present invention, signal quality can be improved in an uplink and a downlink.

DESCRIPTION OF THE REFERENCE NUMERALS

Figure 1:
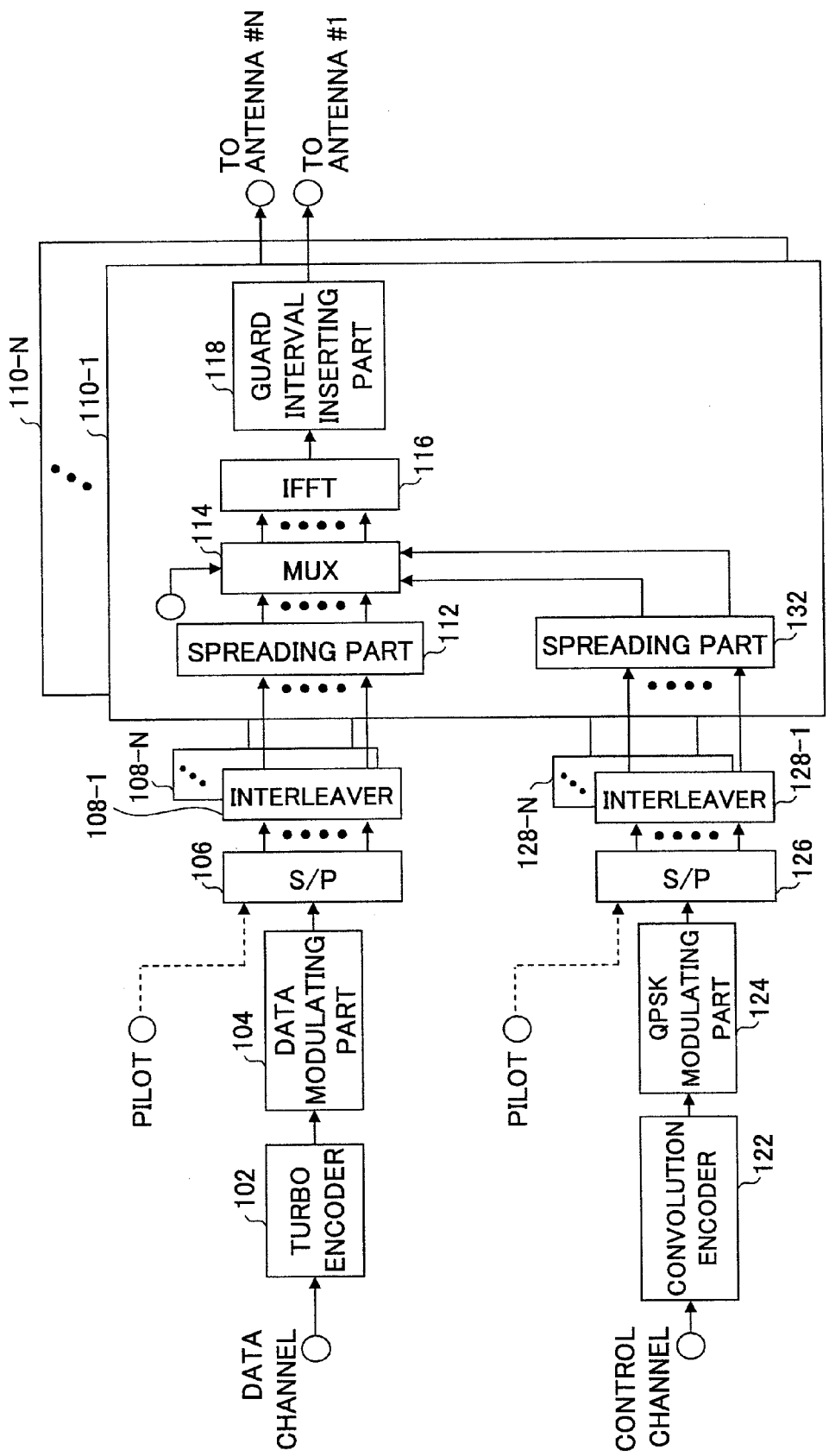
FIG. 1 shows a block diagram of a MIMO-multiplexing-type transmitter.

102 turbo encoder; 104 data modulating part; 106, 107 serial to parallel converting part; 108-1 through N, 105 interleavers; 110-1 through N spread multiplexing parts 110-1 through N; 112 spreading part; 114 multiplexing part; 116 fast inverse Fourier transform part; 118 guard interval inserting part; 122 convolution encoder; 124 QPSK modulating part; 126 serial to parallel converting part; 128-1 through N; 132 spreading part;

502-1 through N reception antennas: 504 low noise amplifier; 506 mixer; 508 local oscillator; 510 bandpass filter; 512 automatic gain controlling part; 514 quadrature detector; 516 local oscillator; 518 analog-to-digital converting part; 520 symbol timing detecting part; 522 guard interval removing part; 524 fast Fourier transform part; 526 demultiplexer; 528 channel estimating part; 530 inverse spreading part; 532 parallel to serial converting part (P/S); 534 inverse spreading part; 536 deinterleaver; 538 turbo encoder 540 Viterbi decoder;

402 transmission diversity coding part;

52 transmission diversity decoding part; 54 deinterleaver;

702 data modulating part; 704 serial to parallel converging part; 706-1, 2 transmission diversity coding parts; 711, 712, 721, 722 transmission antennas

BEST MODE FOR CARRYING OUT THE INVENTION

According to one aspect of the present invention, when transmitting a signal in a MIMO method, a pilot channel is multiplexed to be transmitted by each antenna in one or more of a TDM method, a FDM method and a CDM method. The pilot channel and a data channel are time-multiplexed. The signal is transmitted with the use of one or both of a space division multiplexing (SDM) method, a space time transmission diversity (STTD) method.

By adopting the MIMO method, it is possible to improve an information transmission rate or to improve diversity effect, and to contribute for improving signal quality. Since the pilot channel is transmitted in such a manner that it is distinguished for each antenna, it is possible to precisely estimate a channel.

According to one aspect of the present invention, a pilot channel to transmit by each antenna is multiplexed not in a time division multiplexing method but in a frequency division multiplexing method or a code division multiplexing method. Thereby, even when an interval in which the number of users accommodated by a single TTI (Transmission Time Interval) does not reach the maximum number of users, resource usage efficiency can be improved.

According to one aspect of the present invention, a signal is transmitted in an orthogonal frequency and code division multiplexing (OFCDM) method.

According to one aspect of the present invention, serial to parallel converting means distributes signal sequences to transmit, to the respective ones of the antennas, and interleaving means changes an arrangement of signals in one or more output signal sequences of the serial to parallel converting means. By changing the arrangement of the signals to transmit from the antenna, it is possible to improve transmission quality.

According to one aspect of the present invention, serial to parallel converting means distributes signal sequences to transmit, to the respective ones of the antennas, and interleaving means changes an arrangement of signals in input signal sequences of the serial to parallel converting means. Thereby, it is possible to change the arrangement of the signals among the plurality of antennas, and thus, it is possible to obtain large interleaving effect.

According to one aspect of the present invention, when receiving a signal by a MIMO-type receiver, a pilot channel and a data signal which have been time-multiplexed are separated, and a pilot channel concerning each transmission antenna, which has been multiplexed in one or more of time multiplexing, frequency multiplexing and code multiplexing methods, is separated. A control channel is demodulated in both a demodulating method for a signal which has been transmitted by a single antenna, and a space time transmission diversity (STTD) method. Thereby, it is possible to rapidly demodulate the control channel from any one of base stations of new and old types.

Embodiment 1

[MIMO Multiplexing]

FIG. 1 shows a block diagram of a MIMO-type transmitter applicable to a first embodiment of the present invention. A MIMO multiplexing method is also called a MIMO-space division multiplexing (MIMO-SDM) method. Such a transmitter is typically provided in a base station. However, it may be provided in a mobile station. The transmitter applied to the present embodiment is a transmitter of an orthogonal frequency and code division multiplexing (OFCDM) method. However, in another embodiment, another method may be applied. The transmitter has a turbo encoder 102, a data modulating part 104, a serial to parallel converting part 106, interleavers 108-1 through 108-N, the number of which are the same as the number ($N_{TX}>1$) of transmission antennas, and spread multiplexing parts 110-1 through N, the number of which is the same as the number of the transmission antennas. The spread multiplexing parts have the same configurations and functions, and thus, the first one will be described as a typical one. The spread multiplexing part 110-1 has a spreading part 112, a multiplexing part 114, a fast inverse Fourier transform part 116, a guard interval inserting part 118 and a spreading part 132. Further, the transmitter has a convolution encoder 122, a QPSK modulating part 124, a serial to parallel converting part 126 and interleavers 128-1 through N, the number of which is the same as the number of the transmission antennas.

The turbo encoder 102 carries out coding for improving error resistance on a data channel to be transmitted.

The data modulating part 104 modulates the data channel in an appropriate modulating method such as QPSK, 16 QAM, 64 QAM or such. When an adaptive modulation and coding is applied, the modulating method is changed appropriately.

The serial to parallel converting part (S/P) 106 converts serial signal sequences (stream) into parallel signal sequences. The parallel signal sequences may be determined according to the number of the transmission antennas and the number of subcarriers.

The interleavers 108-1 through N change orders of arrangements of the data channels according to a predetermined pattern. The changing the order of the arrangement is carried out for each antenna in the example shown in the figure.

The spread multiplexing parts 110-1 through N process the data channels for the respective antennas and output baseband OFCDM symbols, respectively. The spreading part 112 carries out code spreading by multiplying each of the parallel signal sequences with a predetermined spreading code. In the present embodiment, two-dimensional spreading is carried out, and thus, the signals are spread in a time direction and/or a frequency direction.

The same processing is carried out also on control channels. The convolution encoder 122 carries out coding for improving the control information data error resistance. The QPSK modulator 124 modulates the control channel in a QPSK modulating method. Although an appropriate any modulating method may be applied, the QPSK modulating method having the small number of modulation levels is adopted in the present embodiment since the information amount of the control information data is relatively small. The serial to parallel converting part (S/P) 126 converts serial signal sequences into parallel signal sequences. The parallel signal sequences may be determined according to the number of subcarriers and the number of transmission antennas. The interleavers 128-1 through N change orders of arrangements of the control channels according to a predetermined pattern. The spreading part 132 multiplies each of the parallel signal sequences with a predetermined spreading code, to carry out code spreading.

The multiplexing part 114 multiplexes the spread data channels with the spread control channels. The multiplexing may be of any one of a time multiplexing, frequency multiplexing and code multiplexing methods. In the present embodiment, a pilot channel is input to the multiplexing part 114, and is also multiplexed. In another embodiment, as shown by a broken arrow, a pilot channel may be input to the serial to parallel converting part 106 or 126, and the pilot channel may be multiplexed with the data channel or the control channel. The fast inverse Fourier transform part 116 carries out fast inverse Fourier transform on an input signal, and carries out OFDM modulation. The guard interval inserting part 118 adds a guard interval to the modulated signal, and thus, creates a symbol in the OFDM method. As well-known, the guard interval is obtained from duplicating a top or a tail part of the symbol to transmit.

Figure 2:
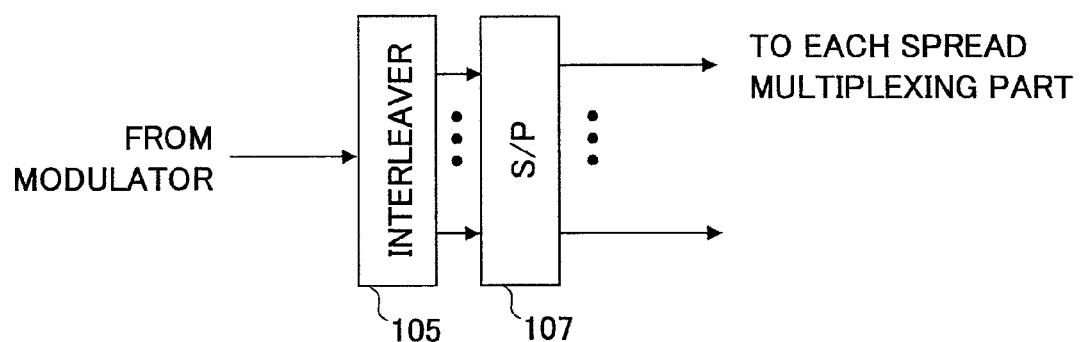
FIG. 2 shows a state in which a positional relationship between a serial to parallel converting part and an interleaver is changed.

It is noted that, positional relationships between the serial to parallel converting parts and the interleavers (106 and 108, and 126 and 128) may be changed as shown in FIG. 2. In the example shown in FIG. 1, the respective interleavers carry out interleaving after the S/P separate the signal for the respective antennas. Thus, changing of the arrangement is carried out within a range of the signal to be transmitted by the single antenna. In contrast thereto, in the configuration shown in FIG. 2, changing of the arrangement by the interleaver 107 influences also among the plurality of antennas. Thus, larger interleaving effect can be expected.

The data channel is coded by the turbo encoder 102 of FIG. 1, is modulated by the data modulating part 104, is converted into a parallel form by the serial to parallel converting part 106, rearranged by the interleaver 108, and is spread for respective subcarrier components by the spreading part 112. In the same manner, the control channels are coded, modulated, converted into a parallel form, interleaved, and spread for the respective subcarrier components. After being spread, the data channels and the control channels are multiplexed by the multiplexing part 114 for the respective subcarriers, are OFDM-modulated by the fast inverse Fourier transform part 116, guard intervals are added to the modulated signals, and the baseband OFCDM symbols are output for the respective antennas. The baseband signal is converted into an analog signal, is orthogonally modulated by the orthogonal modulator 402 of an RF processing part, is appropriately amplified after being limited in band, and is radio-transmitted from each antenna. In this case, from each antenna, a different signal is transmitted simultaneously by the same radio resource. The radio resource may be distinguished by means of at least one of time, frequency and code. Thus, it is possible to increase an information transmission rate in proportion to the number of transmission antennas. In order to receive, demodulate and decode the thus-transmitted signals, a reception side (typically, a mobile station) should understand at least the number of transmission antennas (the number of transmission data sequences).

Figure 3:
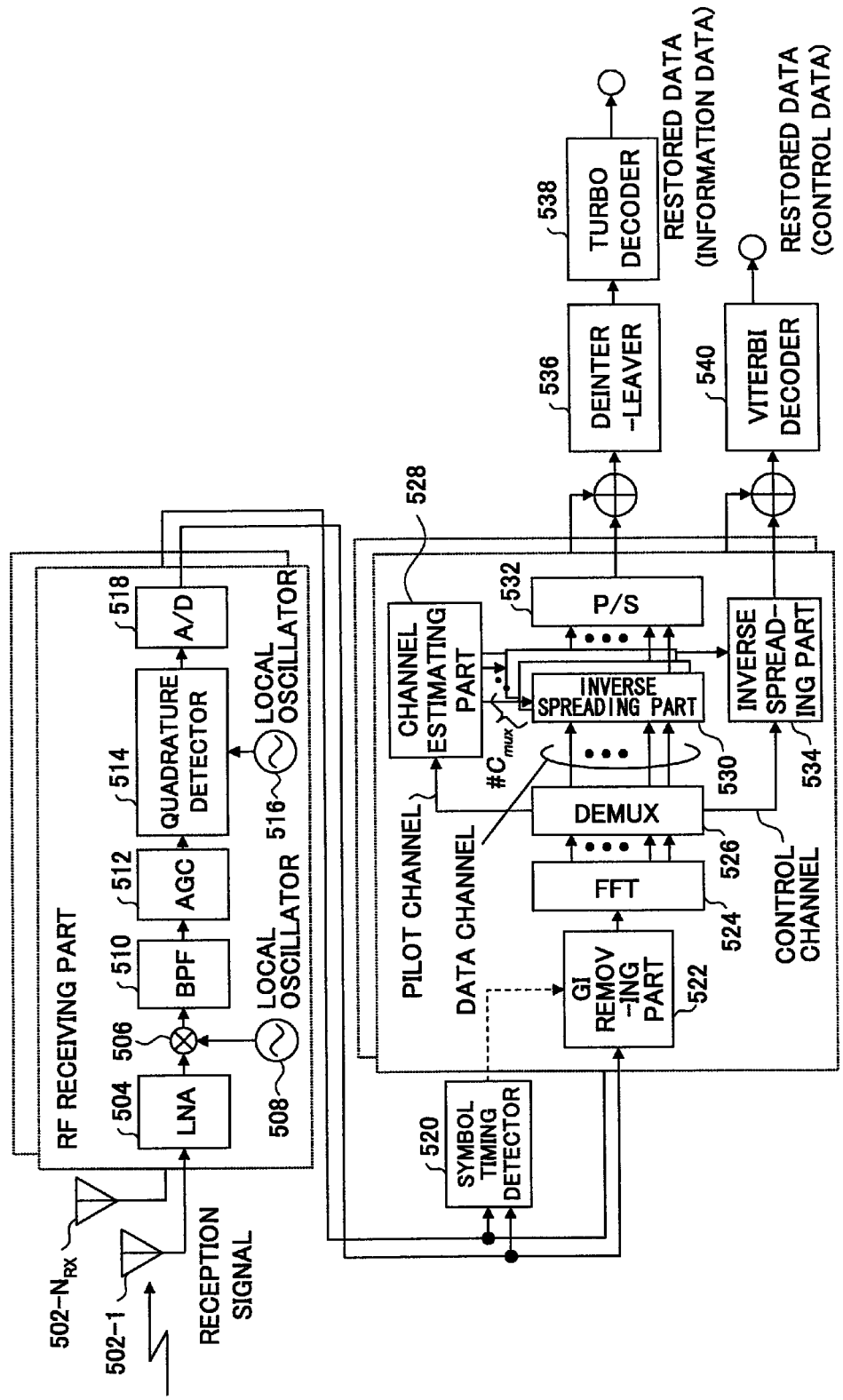
FIG. 3 shows a block diagram of a MIMO-multiplying-type receiver.

FIG. 3 shows a block diagram of a receiver applicable to the embodiment of the present invention. The receiver is typically provided in a base station. However, it may be provided in a mobile station. The receiver has $N_{RX}$ (>1) reception antennas 502-1 through $N_{RX}$, and, for each antenna, the receiver has a low noise amplifier 504, a mixer 506, a local oscillator 508, a bandpass filter 501, an automatic gain controlling part 512, a quadrature detector 514, a local oscillator 516, an analog to digital converting part 518, a guard interval removing part 522, a fast Fourier transform part 524, a demultiplexer 526, a channel estimating part 528, an inverse spreading part 530, a parallel to serial converting (P/S) part 532 and an inverse spreading part 534. Since a processing element and operation for each antenna is the same as each other, a configuration and operation for one antenna will be described as representing the others. The receiver also has a symbol timing detecting part 520, a deinterleaver 536, a turbo encoder 538 and a Viterbi decoder 540.

The low noise amplifier 504 amplifies a signal, received by the antenna 502, appropriately. The signal after being amplified is converted into an intermediate frequency by the mixer 506 and the local oscillator 508 (down convert). The bandpass filter 510 removes unnecessary frequency components. In the automatic gain controlling part 512, a gain of an amplifier is controlled in such a manner that the signal level is appropriately maintained. The quadrature detector 514 uses the local oscillator 516, to carry out orthogonal demodulation based on an in-phase component (I) and a quadrature component (Q). The analog to digital converting part 518 converts the analog signal into a digital signal.

The symbol timing detecting part 520 detects timing of a symbol (symbol boundary) based on the digital signal from each antenna.

The guard interval removing part 522 removes a part corresponding to the guard interval from the received signal.

The fast Fourier transform part 524 carries out fast Fourier transform on the input signal, and carries out OFDM demodulation.

The demultiplexer 526 separates a pilot channel, a control channel and a data channel, multiplexed in the received signal. A method of separating corresponds to multiplexing in the transmission side (the processing contents in the multiplexing part 114 in FIG. 1).

The channel estimating part 528 estimates a situation of a channel, with the use of the pilot channel, and outputs a control signal for adjusting an amplitude and a phase, such as to compensate a channel fluctuation. The control signal is output for each subcarrier.

The inverse spreading part 530 carries out inverse spreading of the data channel for which the channel compensation has been made, for each subcarrier. It is noted that the number of multiplexed codes is $C_{mux}$.

The parallel to serial converting part (P/S) 532 coverts the parallel signal sequences into serial signal sequences.

The inverse spreading part 534 carries out inverse spreading on the control signal on which the channel compensation has been made.

The deinterleaver 536 changes the order of a signal arrangement according to a predetermined pattern. The predetermined pattern corresponding to one, inverse to one of changing the arrangement in the interleaver (108 in FIG. 1) on the transmission side.

The turbo encoder 538 and the Viterbi decoder 540 decode traffic information data and control information data, respectively.

A signal received by the antenna is converted into a digital signal, through amplification, frequency conversion, band limiting, orthogonal demodulation and so forth in an RF receiving part. The digital signal from which the guard interval has been removed is OFDM-demodulated by the fast Fourier transform part 524. The demodulated signal is separated into a pilot signal, a control channel and a data channel, by the separating part 526. The pilot channel is input to the channel estimating part, and the control signal for compensating a channel fluctuation is output therefrom for each subcarrier. The data channel is compensated with the use of the control signal, is inverse-spread for each subcarrier, and is converted into a serial signal. The converted signal is changed in its arrangement by the predetermined pattern by the deinterleaver 536, and is decoded by the turbo decoder 538. The predetermined pattern is inverse to the pattern of rearrangement made by the interleaver. In the same way, the control channel is compensated in its channel fluctuation by the control signal, is inverse-spread, and is decoded by the Viterbi decoder 540. After that, signal processing for utilizing the decoded data and control channel is carried out. In this case, the respective ones of signals from the respective antennas of the transmission side are derived from the received signal by some signal separating method. However, in order to properly demodulate and decode the received signal, the receiver should understand at least the number $N_{TX}$ of the transmission antennas (the number of transmission sequences).

As the signal separating method, for example, a blast method, an MMSE method, an MLD method, or such, may be used. The blast method is such that, a reception level is measured for each transmission antenna, decoding and decision are made in the order starting from a transmission signal having the maximum level, an interference signal (interference replica) is estimated, and the interference replica is subtracted from the received signal so that transmission signals are estimated in sequence. The minimum mean square error (MMSE) method is such that, based on a channel gain from each transmission antenna, an MMSE weight is derived, and the received signals are weighted and combined so that the transmission signals are obtained. The maximum likelihood detection (MLD) method is such that, a channel gain from each transmission antenna is estimated, and a modulated candidate, by which a mean square error between the transmission data modulated candidate and the received signal can be minimized, is selected, and thus the transmission signals are estimated. In the present invention, these methods or another signal separating method may be applied.

[MIMO Diversity]

Figure 4:
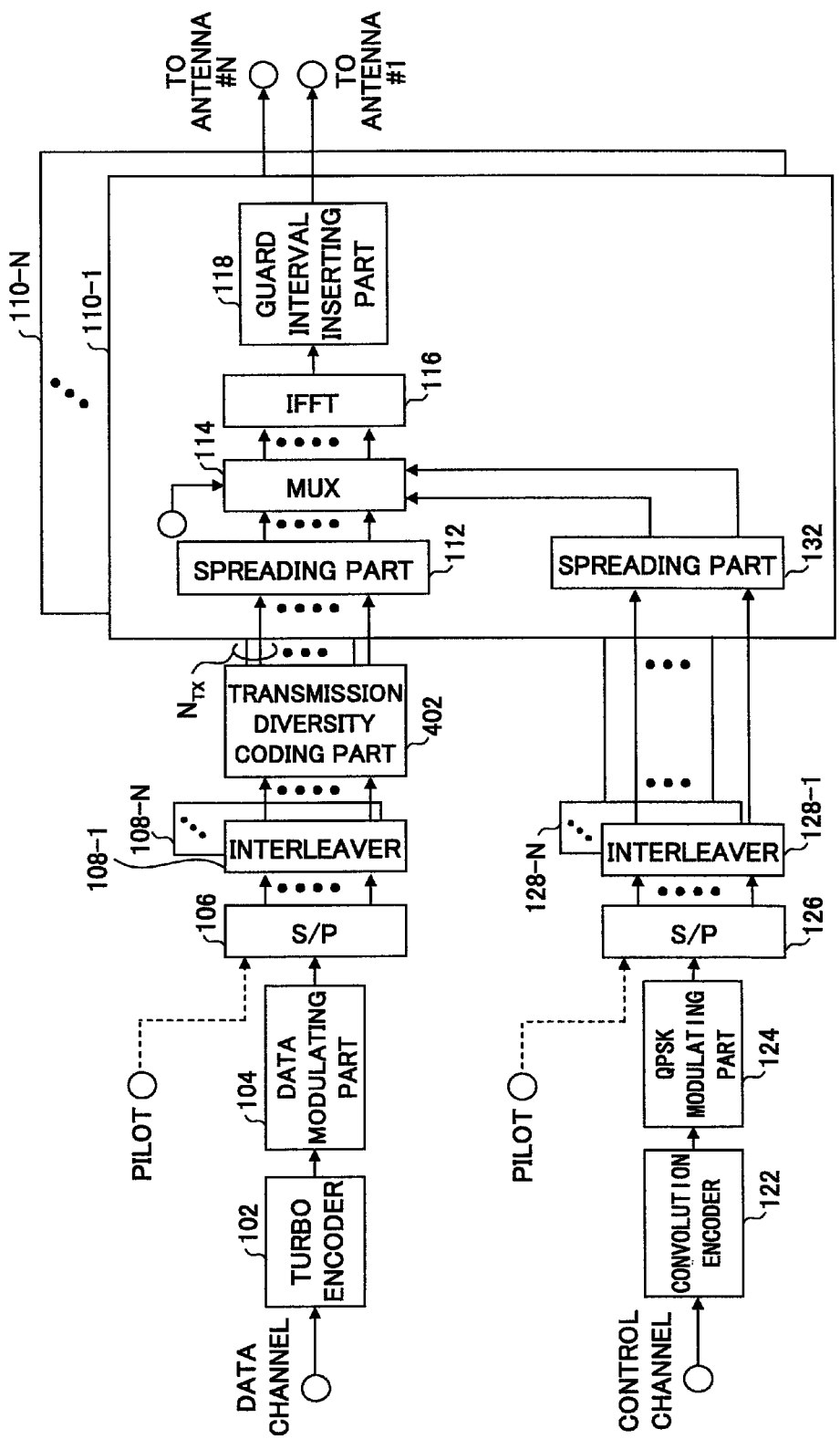
FIG. 4 shows a block diagram of a MIMO-diversity-type transmitter.

FIG. 4 shows a block diagram of a MIMO-diversity-type transmitter. The same reference numerals are given to elements, for which description has been made for FIG. 1, and the duplicate description therefor will be omitted. In FIG. 4, a transmission diversity coding part 402 is shown between an interleaver 108 and a code multiplexing part 110. The transmission diversity coding part 402 adjusts the signal contents, order or such, so that signals transmitted from respective transmission antennas have predetermined correspondence relationship mutually. The transmission diversity coding part 420 may also be called as a space time transmission diversity processing part or an STTD encoder.

Figure 5:
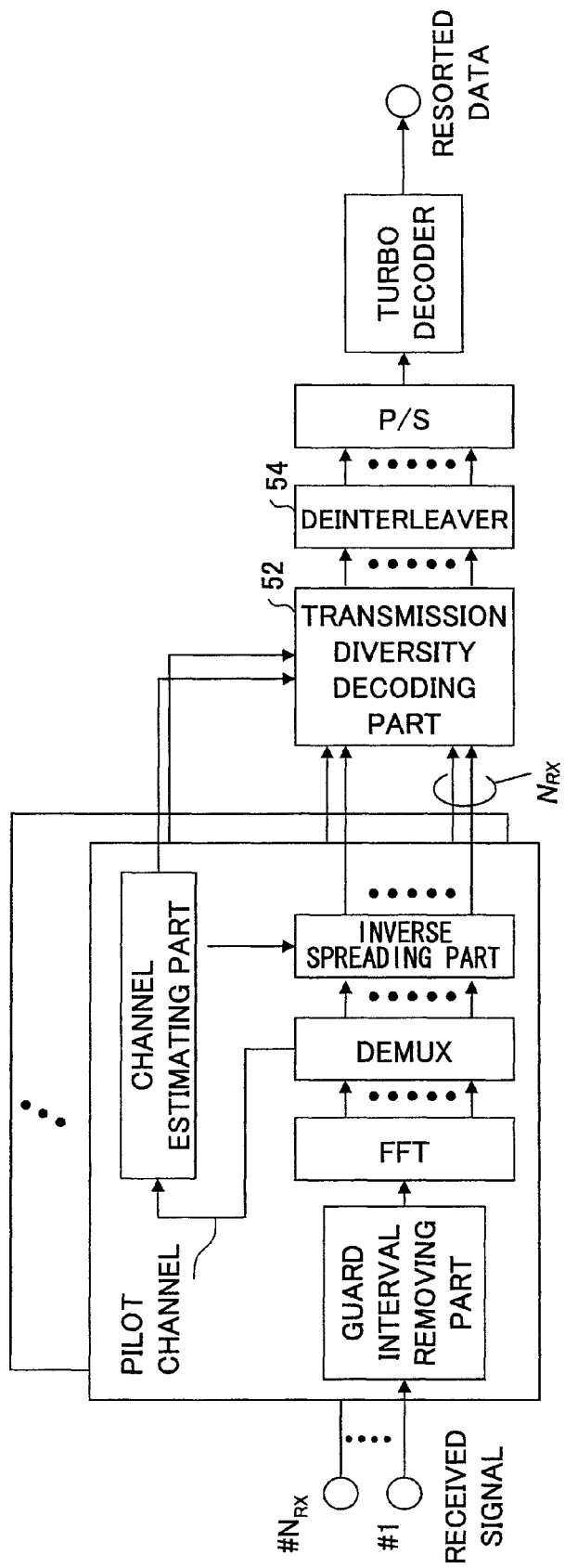
FIG. 5 shows a block diagram of a MIMO-diversity-type receiver.

FIG. 5 shows a block diagram of a MIMO-diversity-type receiver. Elements having been described with reference to FIG. 3 are given the same reference numerals, and the duplicate description therefor will be omitted. In FIG. 5, a transmission diversity decoding part 52, and a deinterleaver 54 are shown. The transmission diversity decoding part 52 separates a signal from each transmission antenna, from a received signal based on an inverse-spread received signal and a channel estimation result. A method of spreading is determined depending on the processing contents carried out in the transmission diversity coding part on the transmission side. The deinterleaver 54 rearranges the decoded signal into a predetermined order. The predetermined order corresponds to a pattern, inverse to the order in which the interleaver on the transmission side made.

Figure 6:
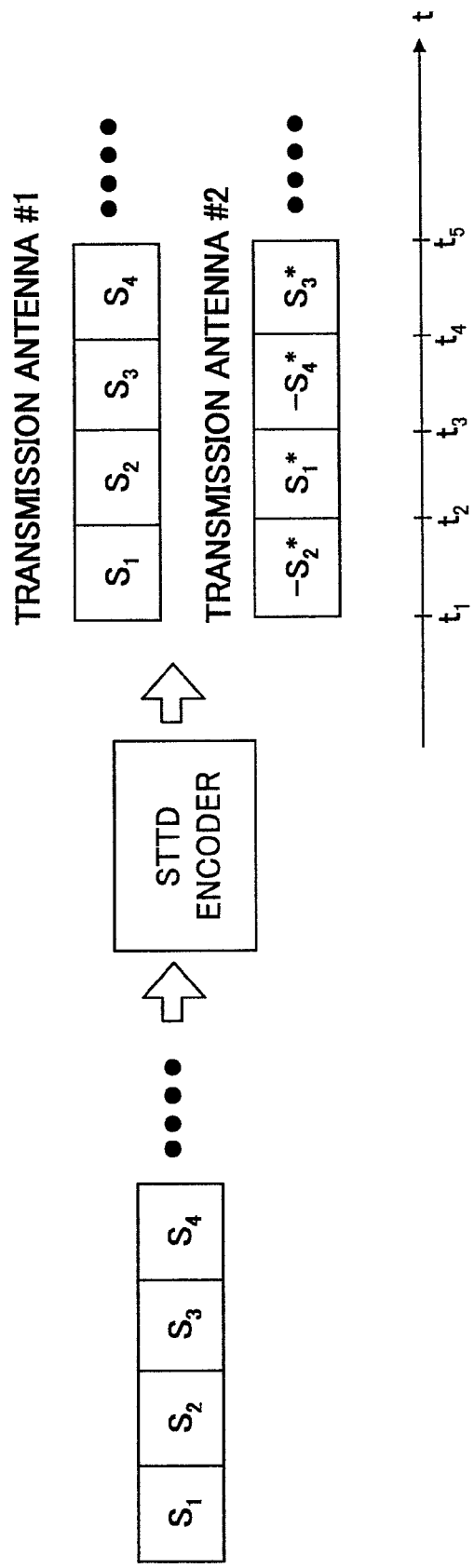
FIG. 6 illustrates operation of a MIMO diversity method.

FIG. 6 shows the contents around signal processing carried out by the transmitter of FIG. 4. For the simplification, it is assumed that a sequence of four symbols denoted by $S_1$, $S_2$, $S_3$ and $S_4$ are input to the turbo encoder 102 in sequence, as data channels. The number of the transmission antenna is assumed as 2 ($N_{TX}$=2). As shown, from the first transmission antenna, the same as the symbol sequence as that input to the encoder, the four symbols $S_1$, $S_2$, $S_3$ and $S_4$ are transmitted in sequence. From the second transmission antenna, symbols such as $-S_2^*$, $S_1^*$, $-S_4^*$ and $S_3^*$ are transmitted in sequence. The symbol "−" denotes a minus sign, and the superscript symbol "*" denotes a complex conjugate. The STTD encoder 402 prepares the sequence of $S_1$, $S_2$, $S_3$ and $S_4$ and the sequence of $-S_2^*$, $S_1^*$, $-S_4^*$ and $S_3^*$ from the input sequence, and gives them to the processing parts for the respective transmission antennas. Therefore, the transmitter radio-transmits a signal expressed by $S_1-S_2^*$ in time of $t_1$-$t_2$, radio-transmits a signal expressed by $S_2+S_1^*$ in time of $t_2$-$t_3$, radio-transmits a signal expressed by $S_3-S_4^*$ in time of $t_3$-$t_4$, radio-transmits a signal expressed by $S_4+S_3^*$ in time of $t_4$-$t_5$, and, after that, radio-transmits the same combined signals. In response thereto, the receiver first receives a signal expressed by $R_1=S_1-S_2^*$, then receives a signal expressed by $R_2=S_2+S_1^*$, then receives a signal expressed by a signal $R_3=S_3-S_4^*$, then receives a signal expressed by a signal $R_4=S_4+S_3$, and after that, receives the same signals. The transmission diversity decoding part 52 obtains the transmitted symbols $S_1$ and $S_2$ based on the relational expression $R_1=S_1-S_2^*$ and the relational expression $R_2=S_2+S_1^*$. These relational expressions should be understood previously in the receiver as predetermined relational expressions.

$$S_1=(R_1+R_2^*)/2$$

$$S_2=(-R_1^*+R_2)/2$$

Similarly, based on the received signals $R_3$ and $R_4$, the transmitted symbols $S_3$ and $S_4$ can be obtained.

In the example shown in FIG. 6, for the simplification, the predetermined correspondence relationship is given to the two transmission symbols, which are then transmitted, and the reception side obtains the transmitter symbols based on the correspondence relationship. However, for more common, some relationship may be given to transmission symbols of more than two. Even when any correspondence relationship is adopted, information having substantially same contents should be transmitted from more than two transmission antennas during a fixed interval (in the above-described example, from both first and second transmission antennas, the information substantially equal to $S_1$, $S_2$, $S_3$ and $S_4$ is transmitted during the interval of $t_1$-$t_5$). Thus, in the transmission diversity method, the information transmission efficiency does not increase. However, the diversity effect increases as the number of transmission antennas increases, and thus, improvement in signal quality and/or reduction in the required transmission power can be achieved. As a result, it is possible to reduce an interference level, which is caused to surrounding cells, this resulting in contribution to increase a system capability. However, the receiver should previously understand, before demodulation, what relationship exists between transmitted symbols in addition to the number of transmission antennas.

[MIMO Multiplexing and Diversity]

Figure 7:
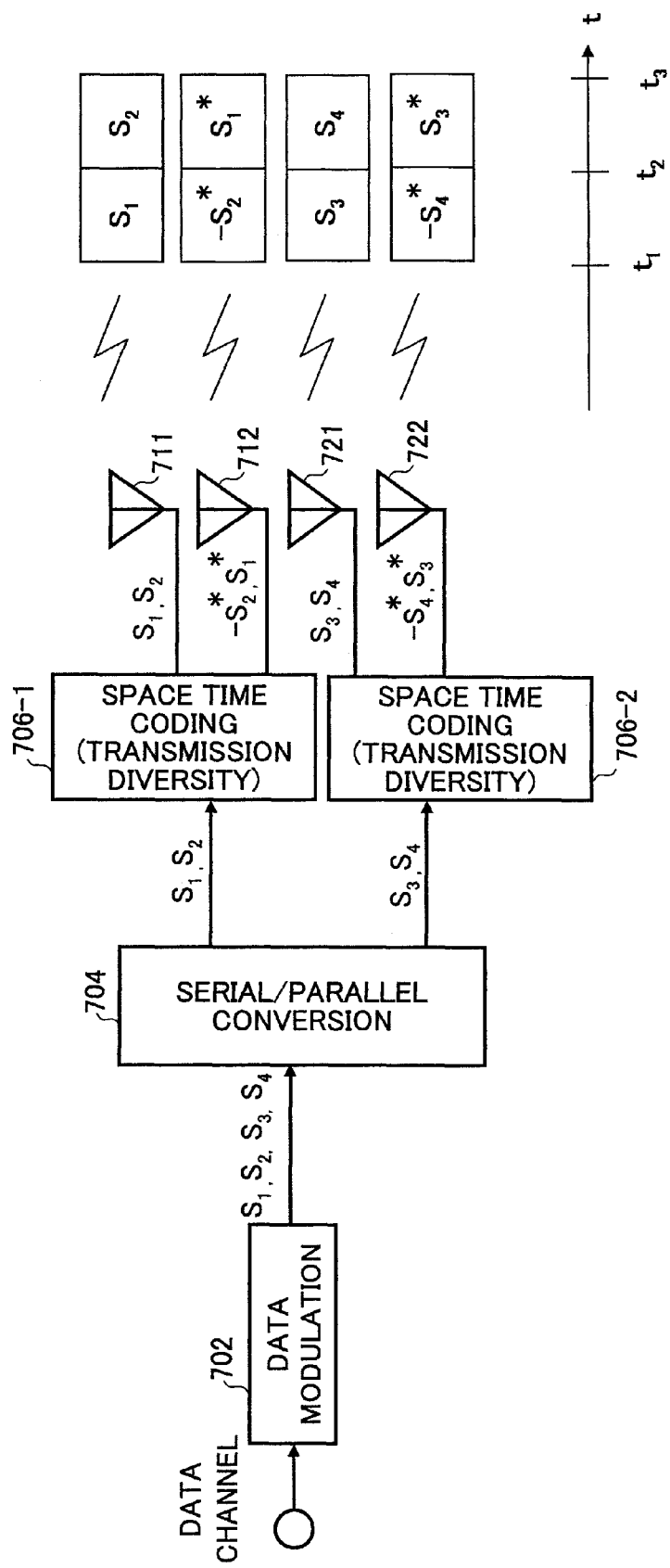
FIG. 7 shows a conceptual diagram of a method of a combination of a MIMO multiplexing method and the MIMO diversity method.

FIG. 7 shows a conceptual diagram of a system in which the MIMO multiplexing method and the MIMO diversity method are combined. In FIG. 7, a data modulating part 702, a serial to parallel converting part 704, a first transmission diversity part 706-1, a second transmission diversity part 706-2 and transmission antennas 711 through 722, are shown.

The transmission modulating part 702 corresponds to the data modulating parts 104 in FIGS. 1 and 4, and, the serial to parallel converting part 704 corresponds to the serial to parallel converting parts 106 and so forth in FIGS. 1 and 4.

Each of the first and second transmission diversity parts 706-1 and 2 respectively has a configuration and a function the same as those of the transmission diversity coding part 402 of FIG. 4.

In operation, a data channel modulated by the data modulating part 702 is separated into mutually different sequences by the serial to parallel converting part 704, and are respectively input to the first and second transmission diversity coding parts 706-1 and 2. For example, assuming that the modulated symbol science is $S_1, S_2, S_3$ and $S_4$, $S_1$ and $S_2$ may be input to the first transmission diversity part 706-1, while $S_3$ and $S_4$ may be input to the second transmission diversity part 706-2. The first transmission diversity part 706-1 duplicates the input symbols, creates two symbol sequences having a predetermined correspondence relationship, and transmits them from the transmission antennas, respectively. For example, from the first transmission antenna 711, $S_1$ and $S_2$ are radio-transmitted in sequence, while, from the second transmission antenna 712, $-S_2^*$ and $S_1$ are radio-transmitted in sequence. In the same way, the second transmission diversity part 706-2 also duplicates the input symbols, creates two symbol sequences having a predetermined correspondence relationship, and transmits them from the transmission antennas, respectively. For example, from the first transmission antenna 721, $S_3$ and $S_4$ are radio-transmitted in sequence, while, from the second transmission antenna 722, $-S_4^*$ and $S_3^*$ are radio-transmitted in sequence. As a result, the transmitter radio-transmits $S_1-S_2^*+S_3-S_4^*$ first, and, in subsequent time, radio-transmits $S_2+S_1^*+S_4^*+S_3^*$.

A receiver first receives $R_1=S_1-S_2^*+S_3-S_4^*$, and, in subsequent time, receives $R_2=S_2+S_1^*+S_4^*+S_3^*$. The receiver carries out some signal separating method based on the first received signal $R_1$, and estimates a group of symbols transmitted by the four transmission antennas. As a result, estimation can be made such that, in first time, $S_1, -S_2^*, S_3$ and $-S_4^*$ have been transmitted from the four transmission antennas respectively. Further, the receiver carries out some signal separating method based on the second received signal $R_2$, and estimates a group of symbols transmitted by the four transmission antennas. As a result, estimation can be made such that, in subsequent time, a fact that $S_2, S_1^*, S_4^*$ and $S_3^*$ have been transmitted from the four transmission antennas respectively. These two groups of symbols are substantially the same as one another (merely, signs are different or, whether a complex conjugate or not), the receiver can estimate the four symbols $S_1, S_2, S_3$ and $S_4$ with high preciseness therewith. The number of transmission antennas, the number of parallel signal sequences, the diversity coding method and so forth, may be changed variously from the above-mentioned ones.

[Channel]

With the use of the above-described MIMO multiplexing method, MIMO diversity method and the method of the combination thereof, various channels may be transmitted by an uplink or a downlink. However, mainly for the downlink, increase in capability, increase in speed and increase in quality are required. By the downlink, (D1) a common control channel, (D2) an associated control channel, (D3) a shared packet data channel and (D4) a dedicated packet data channel are transmitted as channels including traffic data. By the uplink, (U1) a common control channel, (U2) an associated control channel, (U3) a shared packet data channel and (U4) a dedicated packet data channel are transmitted as channels including traffic data. By the downlink and uplink, pilot channels, not including traffic data, are also transmitted as is necessary. The pilot channels include known signals which are previously known to the transmission side and the reception side, and in particular, are used for channel estimation or such.

(D1) The downlink common control channel includes a broadcasting control channel (BCH), a paging channel (PCH) and a downlink access channel (FACH). The common control channel includes control information concerning processing of a relatively high layer such as link setting, call control or such.

(D2) The associated channel includes control information concerning processing of a relatively low layer, and includes information required for demodulating the shared packet data channel. The required information may include, for example, a packet number, a modulation method, a coding method, a transmission power control bit, a retransmission control bit, or such.

(D3) The shared packet data channel is a high-speed radio resource shared by a plurality of users. The radio resource may be distinguished by a frequency, code, transmission power or such. Sharing of the radio resource may be made in a time division multiplexing (TDM), frequency division multiplexing (FDM) and/or code division multiplexing (CDM) method. A specific manner of the multiplexing will be described with reference to FIG. 14. In order to realize high-quality data transmission, an adaptive modulation and coding (AMC) method, an automatic repeat request (ARQ) method, or such, is adopted.

(D4) The dedicated packet data channel is a radio resource specially allocated to a specific user. The radio resource may be distinguished by a frequency, code, transmission power or such. In order to realize high-quality data transmission, the adaptive modulation and coding (AMC) method, the automatic repeat request (ARQ) method, or such, is adopted.

(U1) The uplink common control channel includes a random access channel (RACH) and a reserve channel (RCH). The common control channel includes control information concerning a relatively high layer such as link setting, call control, or such.

(U2) The associated channel includes control information concerning processing of a relatively low layer, and includes information required for demodulating the shared packet data channel. The required information may include, for example, a packet number, a modulation method, a coding method, a transmission power control bit, a retransmission control bit, or such.

(U3) The shared packet data channel is a high-speed radio resource shared by a plurality of users. The radio resource may be distinguished by a frequency, code, transmission power or such. Sharing of the radio resource may be made in a time division multiplexing (TDM), frequency division multiplexing (FDM) and/or code division multiplexing (CDM) method.

(U4) The dedicated packet data channel is a radio resource specially allocated to a specific user. The radio resource may be distinguished by a frequency, code, transmission power or such. In order to realize high-quality data transmission, the adaptive modulation and coding (AMC) method, the automatic repeat request (ARQ) method, or such is adopted.

[Transmission by Downlink]

Figure 8:
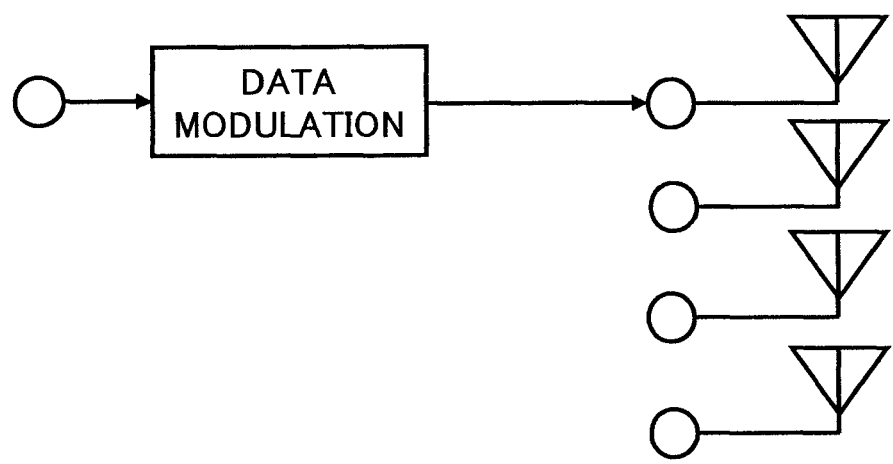
FIG. 8 shows a conceptual diagram of a case where a signal is transmitted from a single antenna.

Below, a transmission method for each channel by a downlink will be described. Since the common control channel includes broadcasting information such as a cell number, it should be received by all the mobile stations. In order to easily satisfy the requirement, the common control channel may be transmitted from a single signal transmission antenna from among a plurality of transmission antennas provided in the base station, as shown in FIG. 8. In this case, the other transmission antennas are not used for transmitting this channel. As described above, in order to properly demodulate a signal transmitted in the MIMO multiplexing method or the MIMO diversity method, additional information such as the number of transmission antennas is required. However, when transmission is made by the single transmission antenna, such information is not required, and demodulation can be made from a received signal immediately. On one hand, the common control signal includes information concerning call control, and thus, it is required that communication is positively made rather than communication is made at a high speed. From this viewpoint, it is preferable that, additional information such as the number of transmission antennas or such is given to the mobile station by some method, and the common control channel is transmitted in the MIMO diversity method.

In the same way for the associated control channel, one of a plurality of transmission antennas may be used to transmit it, or, it may be transmitted in the MIMO diversity method. Alternatively, the same contents may be simultaneously transmitted from a plurality of transmission antennas.

In the same way for the data channel, one of a plurality of transmission antennas may be used to transmit it, or, it may be transmitted in the MIMO diversity method. The data channel is transmitted from the base station in such a manner as to correspond to the capability of the mobile station in a condition in which a link has been established. Therefore, the data channel may be transmitted in the MIMO multiplexing method, or, in the method of the combination of the MIMO diversity method and the MIMO multiplexing method. It is possible to improve the transmission rate by using, at least partially, the MIMO multiplexing method.

[Transmission and Reception by Uplink and Downlink]

The mobile station obtains information of the number of transmission antennas, transmission methods of various channels, and so forth, based on the received common control channel.

When the common control channel has been transmitted from a single transmission antenna, the mobile station can immediately demodulate the received common control channel. Thereby, the contents of BCH, PCH and FACH can be understood. The mobile station uses the uplink common control channel (RACH), to transmit to the base station, information concerning the capability of the mobile station (the number of reception antennas, the number of transmission antennas and so forth), a required service (required transmission rate), and so forth. The base station uses the downlink common control channel (FACH), to notify the mobile station of a transmission method (the number of transmission antennas or such) for the associated control channel. A transmission method for the data channel may be notified of to the mobile station with the use of the common control channel (FACH), or, may be notified of to the mobile station with the use of the associated control channel. In the latter case, in addition to information concerning a modulation method and a coding factor for a transmission slot of each mobile station, a transmission method (the MIMO multiplexing method, the MIMO diversity method, the method of the combination thereof) is notified of to the mobile station.

Next, the case where the common control channel has been transmitted in the MIMO diversity method will be discussed. In this case, it is assumed that a coding method of the MIMO diversity method (for example, the number of transmission antennas is two, and a signal is transmitted by the processing contents shown in FIG. 6) is known to the mobile station. When all the base stations transmit in the same MIMO diversity method, the mobile station can proceed with signal processing the same as the above by extracting necessary information from the received common control channel based on such a previous agreement. However, an old-type base station which has only a single transmission antenna may exist in a district. In such a case, a signal cannot be demodulated satisfactorily in the MIMO diversity method. The mobile station according to the present embodiment attempts to demodulate the common control channel in both of two methods. One of the two methods is a demodulation method for a case where the common control channel is transmitted from a single transmission antenna. The other is a demodulation method for a case where it is transmitted in the MIMO diversity method. Necessary information is extracted from a channel which has been satisfactorily demodulated from one of these two methods. An order of demodulating in both two methods may be such as simultaneous, or, such that either one may be carried out first. After that, the same processing is carried out. That is, the mobile station uses the uplink common control channel (RACH), to transmit information concerning the capability (the number of reception antennas, the number of transmission antennas and so forth) of the mobile station, the required service (required transmission rate) or such, to the base station. The base station uses the downlink common control channel (FACH), to notify the mobile station of the transmission method (the number of transmission antennas or such) for the associated control channel, to the mobile station.

Embodiment 2

As described above, a pilot channel is used for channel estimation or such. In the MIMO method, a channel is different for each transmission antenna, and thus, the pilot channel should be transmitted from each transmission antenna in a distinguished manner. Therefore, when a transmitter transmits a pilot channel, a control channel and a data channel in a multiplexed manner, the pilot channel should be distinguished for each transmission antenna. Below, various examples concerning multiplexing a pilot channel will be described, they are merely examples, and thus, are not listed for a limiting purpose.

Figure 9A:
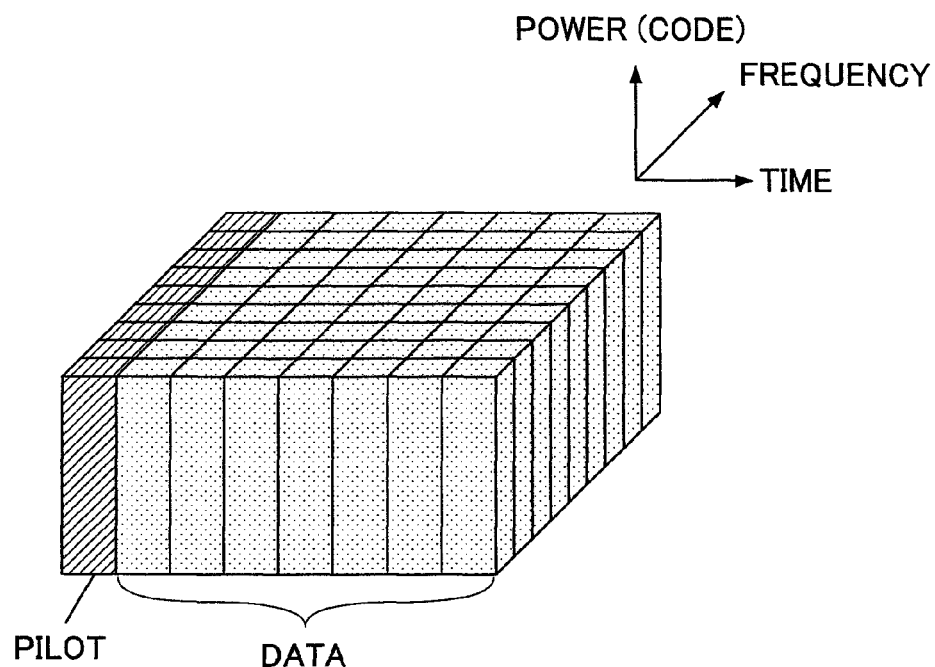
FIG. 9A shows one example of multiplexing for a case where a pilot channel is transmitted from a single transmission antenna.
Figure 9B:
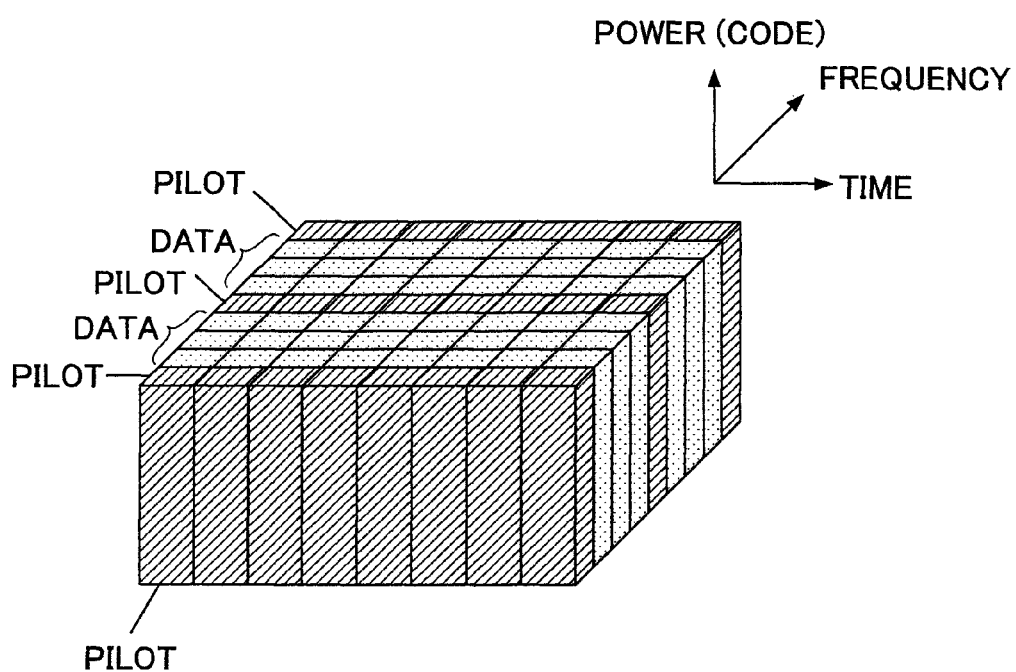
FIG. 9B shows one example of multiplexing for a case where a pilot channel is transmitted from a single transmission antenna.

FIGS. 9A-B shows an example of multiplexing where a signal is transmitted from a single transmission antenna from among a plurality of transmission antennas. For the purpose of simplification, the control channel is not shown. In this case, only the single transmission antenna transmits the signal. FIG. 9A shows a state in which pilot channels and data channels are time-multiplexed. FIG. 9B shows a state in which a pilot channel and a data channel are frequency-multiplexed.

Figure 10A:
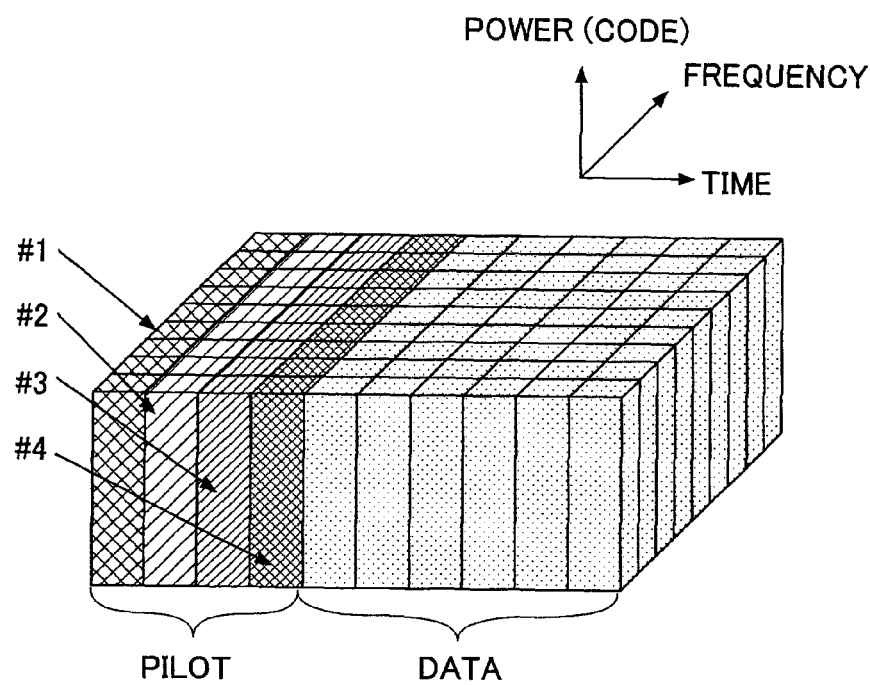
FIG. 10A is a diagram (No. 1) showing a state in which multiplexing is carried out with pilot channels transmitted by four transmission antennas being distinguished.
Figure 10B:
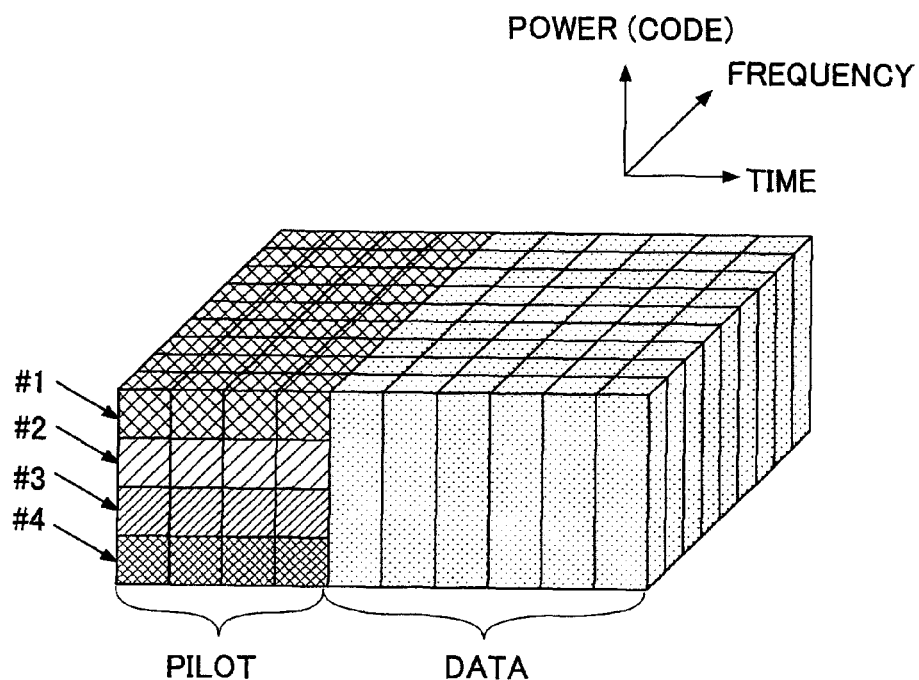
FIG. 10B is a diagram (No. 1) showing a state in which multiplexing is carried out with pilot channels transmitted by four transmission antennas being distinguished.
Figure 10C:
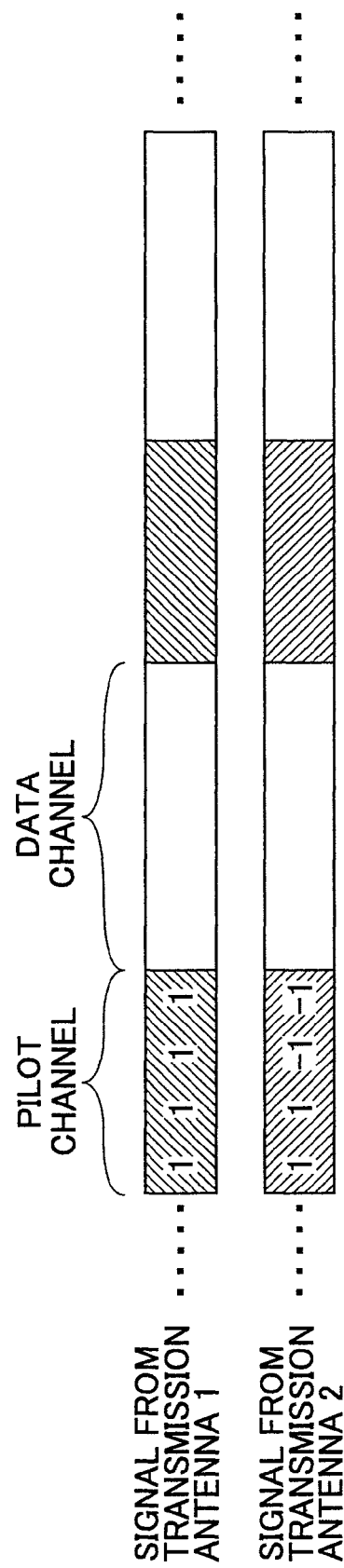
FIG. 10C is a diagram (No. 1) showing a state in which multiplexing is carried out while pilot channels transmitted by four transmission antennas being distinguished.

FIGS. 10A-C show a state (No. 1) in which pilot channels transmitted from four transmission antennas are multiplexed in such a manner that they are distinguished. The pilot channels and data channels are time-multiplexed. In FIG. 10A, a state is shown in which the pilot channels concerning the four transmission channels #1 through #4 are time-multiplexed. In FIG. 10B, a state is shown in which the pilot channels concerning the four transmission channels are code-multiplexed. In any case, the pilot channels are inserted successively in the frequency direction, and thus, it is possible to improve the diversity effect as a result of interleaving being made in the frequency direction. FIG. 10C shows a conceptual diagram of signals transmitted from first and second transmission antennas. As shown, a state is shown in which pilot channels transmitted from the first transmission antenna are distinguished by codes of 1, 1, 1 and 1, and pilot channels transmitted from the second transmission antenna are distinguished by codes of 1, 1, −1 and −1. These codes are merely examples, and any appropriate orthogonal patterns may be used.

Figure 11A:
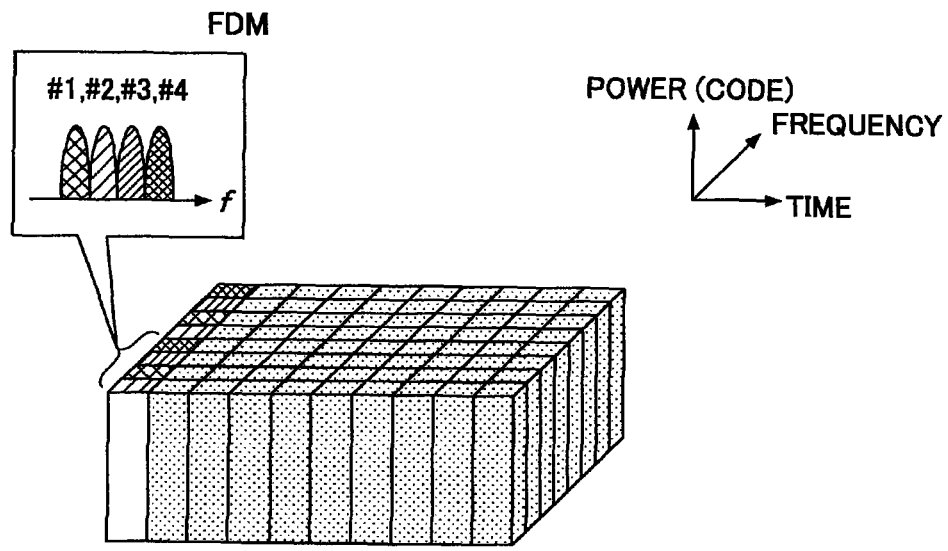
FIG. 11A is a diagram (No. 2) showing a state in which multiplexing is carried out with pilot channels transmitted by four transmission antennas being distinguished.
Figure 11B:
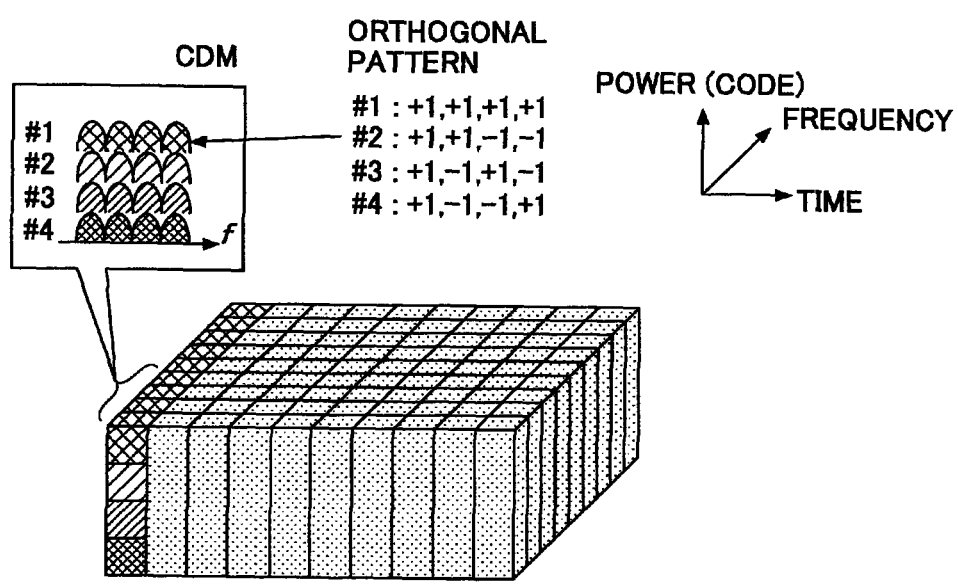
FIG. 11B is a diagram (No. 2) showing a state in which multiplexing is carried out with pilot channels transmitted by four transmission antennas being distinguished.
Figure 11C:
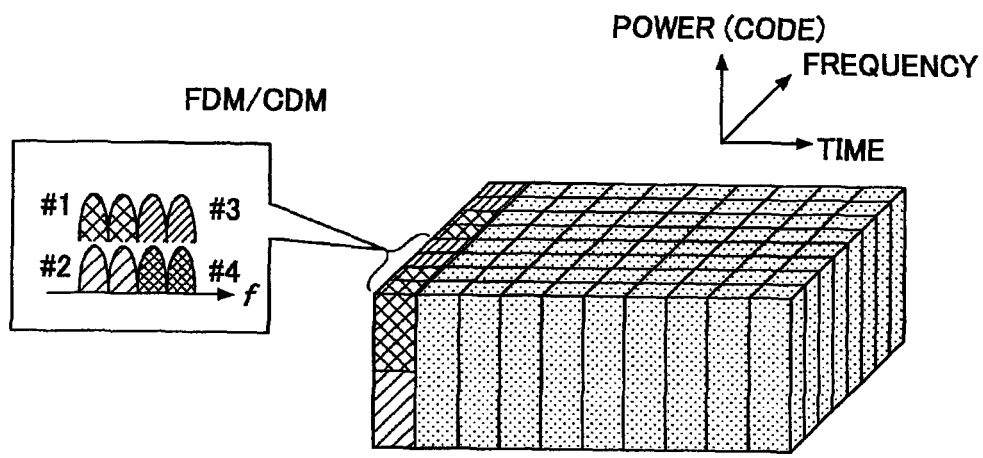
FIG. 11C is a diagram (No. 2) showing a state in which multiplexing is carried out while pilot channels transmitted by four transmission antennas being distinguished.

FIGS. 11A-C show a state (No. 2) in which pilot channels transmitted from four transmission antennas are multiplexed in such a manner that they are distinguished. The pilot channels and data channels are time-multiplexed. In FIG. 11A, a state is shown in which the pilot channels concerning the four transmission antennas are frequency-multiplexed. From a viewpoint of easily and satisfactorily carrying out channel estimation for each subcarrier, this method is preferable. In FIG. 11B, a state is shown in which the pilot channels concerning the four transmission antennas are code-multiplexed. In FIG. 11C, a state is shown in which the pilot channels concerning the four transmission antennas are frequency-multiplexed and code-multiplexed. In comparison to the code-multiplexing of the four, it is possible to shorten a code length. In any case of (A), (B) and (C), it is possible to improve information transmission efficiency by utilization of multiplexing in the frequency domain. Since multiplexing is made in the time direction in the example of FIGS. 10A-C, only part of resources prepared for the maximum number of symbols are used when the number of symbols transmitted within a single transmission time interval (TTI) is small. As a result, the resource usage efficiency degrades.

Figure 12A:
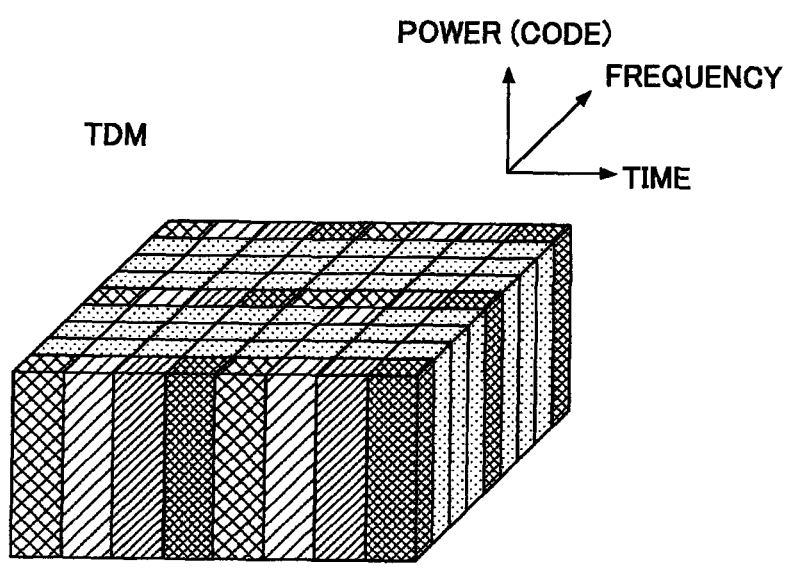
FIG. 12A is a diagram (No. 3) showing a state in which multiplexing is carried out with pilot channels transmitted by four transmission antennas being distinguished.
Figure 12B:
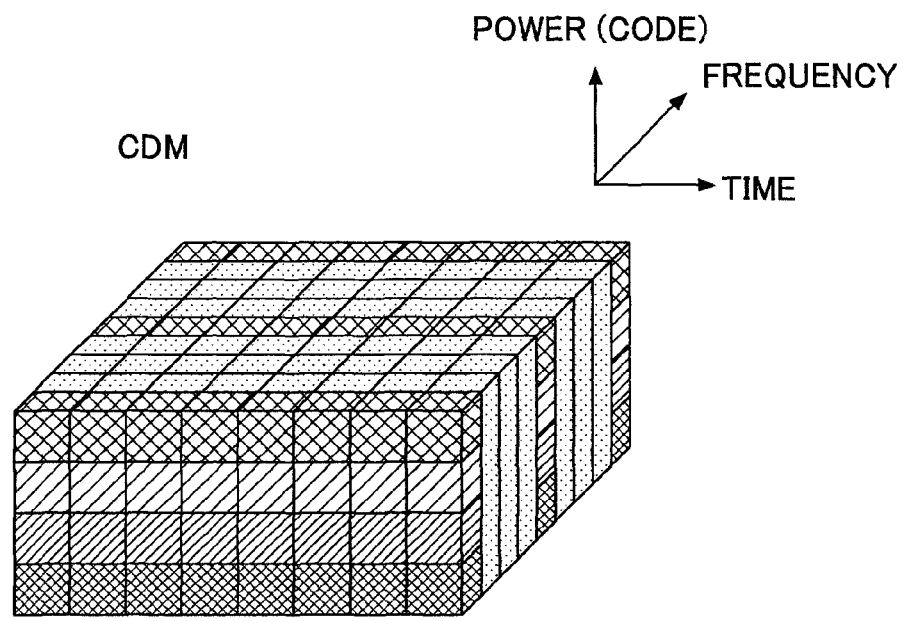
FIG. 12B is a diagram (No. 3) showing a state in which multiplexing is carried out with pilot channels transmitted by four transmission antennas being distinguished.
Figure 12C:
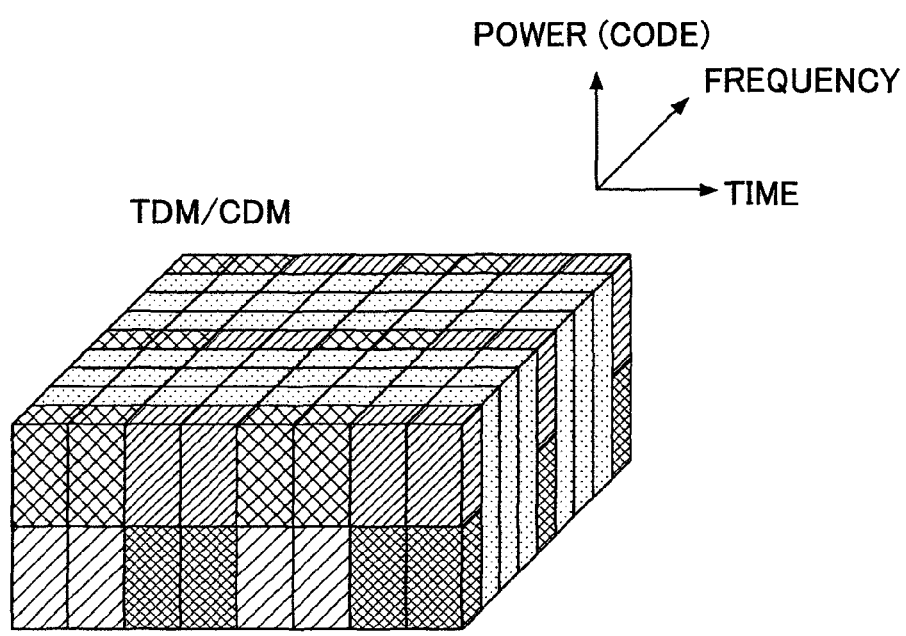
FIG. 12C is a diagram (No. 3) showing a state in which multiplexing is carried out while pilot channels transmitted by four transmission antennas being distinguished.

FIGS. 12A-C show a state (No. 3) in which pilot channels transmitted from four transmission antennas are multiplexed in such a manner that they are distinguished. The pilot channels and data channels are time-multiplexed. FIG. 12A shows a state in which time-multiplexing is made for each transmission antenna in the pilot channels. FIG. 12B shows a state in which code-multiplexing is made for each transmission antenna in the pilot channels. FIG. 12C shows a state in which time-multiplexing and code-multiplexing are made for each transmission antenna in the pilot channels. Generally speaking, a fluctuation in the time direction is small, and thus, it is possible to satisfactorily maintain orthogonality among the transmission antennas.

The preferable embodiments of the present invention have been thus described. The present invention is not limited thereto, and various variation and change may be made within the range of the point of the present invention. For the purpose of convenience in description, the present invention has been described in a manner of being separated to some embodiments. However, separating into the respective embodiments is not a substance of the present invention, and, one or more embodiments may be used as is necessary.

The invention claimed is:

1. A transmission apparatus for carrying out radio transmission of different signals simultaneously from respective ones of a plurality of antennas, comprising:
   an inputting part for inputting a control channel and a data channel; and
   a multiplexing part for separating the data channel, which is input by the inputting part and is different from the control channel maintaining one symbol sequence, into a plurality of symbol sequences, and adjusting contents of the respective symbol sequences so that symbol sequences of the control channel and the data channel to be transmitted from respective ones of the plurality of antennas mutually have a predetermined relationship, while the adjustment so that the symbol sequences of the data channel have the predetermined relationship is omitted in some cases.

2. The transmission apparatus as claimed in claim 1, wherein:
   the multiplexing part multiplexes pilot channels to be transmitted from the respective antennas according to a frequency division multiplexing method or a code division multiplexing method.

3. A reception apparatus, comprising:
   a receiving part for receiving, by a plurality of reception antennas, signals which have been radio-transmitted simultaneously from respective ones of a plurality of transmission antenna; and
   a demodulating part for demodulating the signals received by the receiving part,
   wherein, in the signals received by the receiving part, a data channel under transmission, which is different from a control channel under transmission maintaining one symbol sequence, is separated into a plurality of symbol sequences, and the contents of the respective symbol sequences are adjusted so that symbol sequences of the control channel and the data channel transmitted from respective ones of the plurality of transmission antennas mutually have a predetermined relationship, while the adjustment so that the symbol sequences of the data channel have the predetermined relationship is omitted in some cases.

4. A transmission method for carrying out radio transmission of different signals simultaneously from respective ones of a plurality of antennas, comprising the steps of:
   Inputting a control channel and a data channel; and
   separating the input data channel, which is different from the control channel maintaining one symbol sequence, into a plurality of symbol sequences, and adjusting contents of the respective symbol sequences so that symbol sequences of the control channel and the data channel to be transmitted from respective ones of the plurality of antennas mutually have a predetermined relationship, while the adjustment so that the symbol sequences of the data channel have the predetermined relationship is omitted in some cases.

5. A reception method, comprising the steps of:
   receiving, by a plurality of reception antennas, signals which have been radio-transmitted simultaneously from respective ones of a plurality of transmission antennas; and
   demodulating the received signals,
   wherein, in the received signals, received in the receiving step, a data channel under transmission, which is different from a control channel under transmission maintaining one symbol sequence is separated into a plurality of symbol sequences, and the contents of the respective symbol sequences are adjusted so that symbol sequences of the control channel and the data channel transmitted from respective ones of the plurality of transmission antennas mutually have a predetermined relationship, while the adjustment so that the symbol sequences of the data channel have the predetermined relationship is omitted in some cases.

6. A communication system, comprising:

a transmission apparatus for carrying out radio transmission of different signals simultaneously from respective ones of a plurality of antennas; and a reception apparatus for receiving signals radio-transmitted from the transmission apparatus;

wherein the transmission apparatus comprises:

an inputting part for inputting a control channel and a data channel; and a multiplexing part for separating the data channel, which is input by the inputting part and is different from the control channel maintaining one symbol sequence, into a plurality of symbol sequences, and adjusting contents of the respective symbol sequences so that symbol sequences of the control channel and the data channel to be transmitted from respective ones of the plurality of antennas mutually have a predetermined relationship, while the adjustment so that the symbol sequences of the data channel have the predetermined relationship is omitted in some cases.

7. The communication system as claimed in claim 6, wherein the multiplexing part multiplexes pilot channels to be transmitted from the respective antennas according to a frequency division multiplexing method or a code division multiplexing method.

* * * * *